Feb. 12, 1946.  H. E. SCHRADER  2,394,638
ELEVATOR
Filed July 10, 1942   12 Sheets-Sheet 2

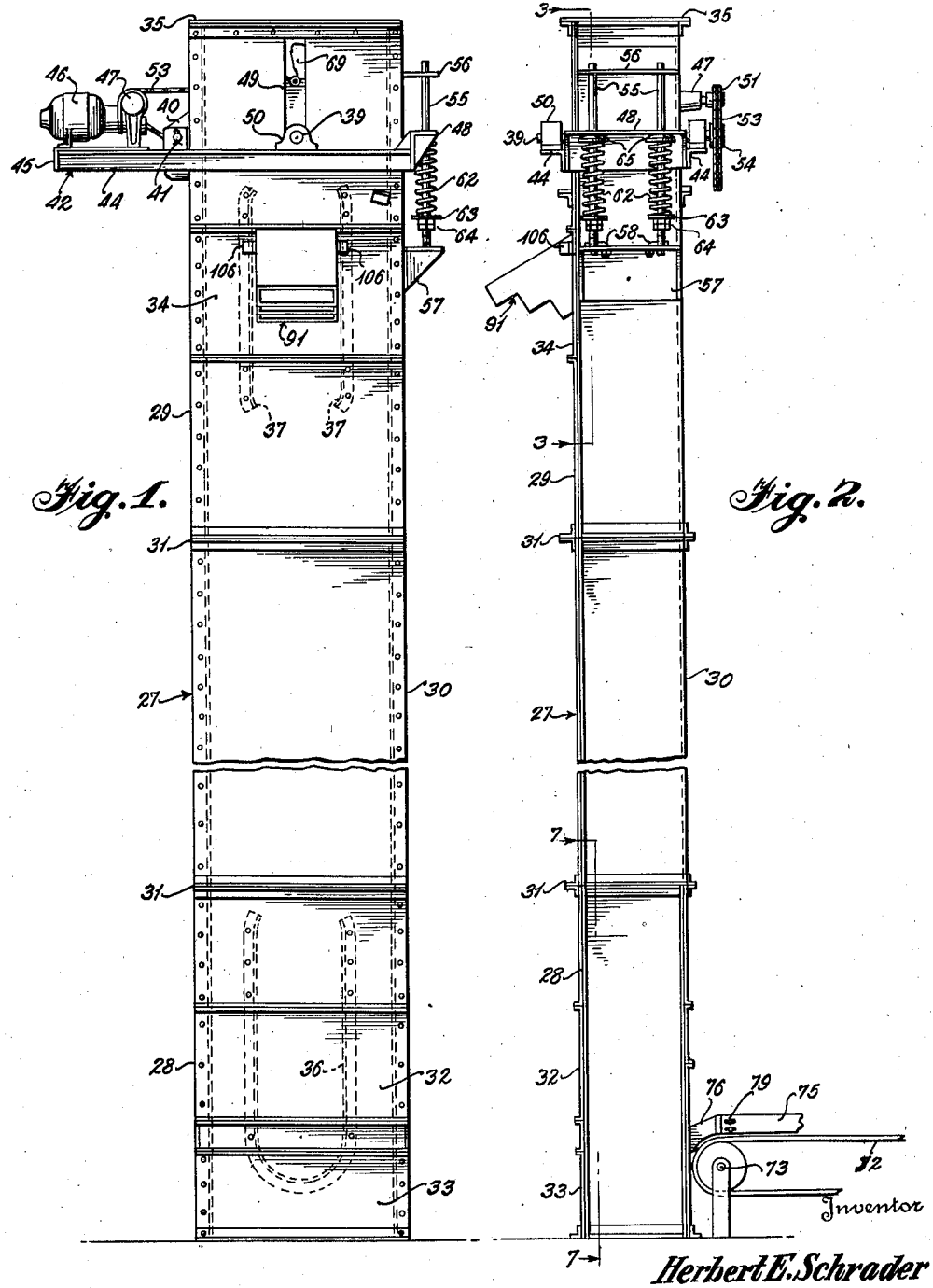

Inventor
Herbert E. Schrader

Feb. 12, 1946.     H. E. SCHRADER     2,394,638
ELEVATOR
Filed July 10, 1942     12 Sheets-Sheet 3
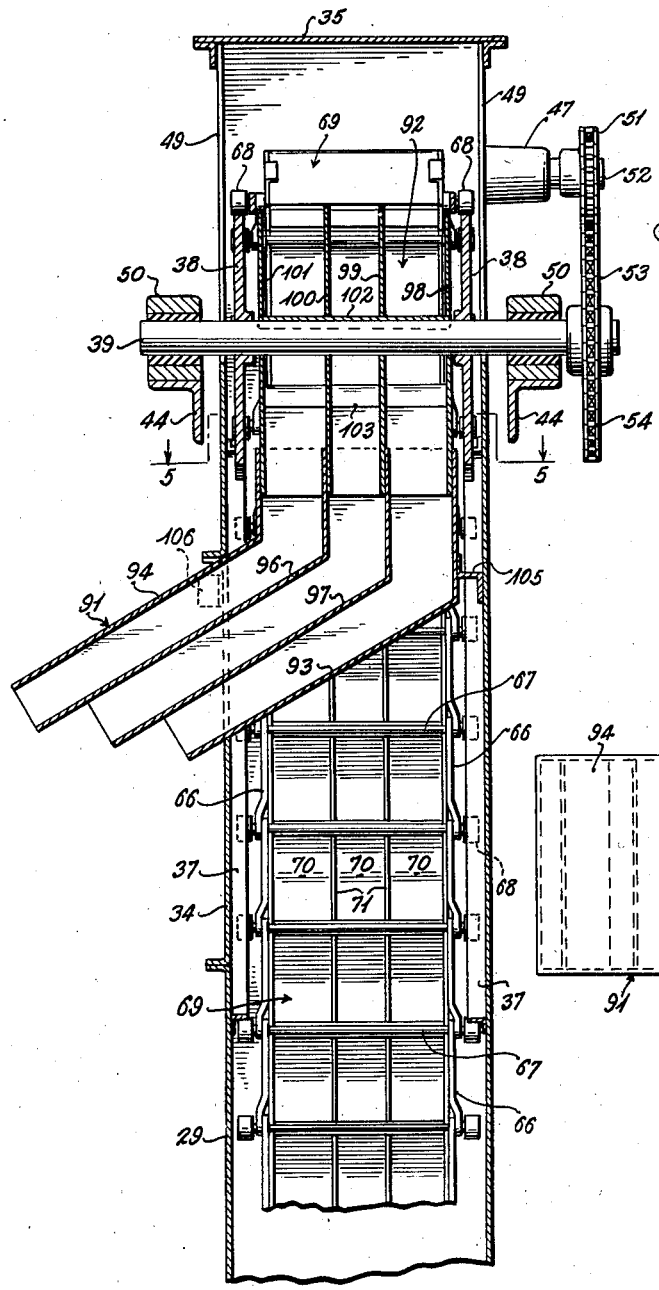
Inventor
*Herbert E. Schrader*
By *L. Donell Myers*
Attorney Feb. 12, 1946. H. E. SCHRADER 2,394,638
ELEVATOR
Filed July 10, 1942 12 Sheets-Sheet 4

Inventor
*Herbert E. Schrader*
By
Attorney

Feb. 12, 1946.   H. E. SCHRADER   2,394,638
ELEVATOR
Filed July 10, 1942   12 Sheets-Sheet 5
Fig. 8.
Fig. 9.
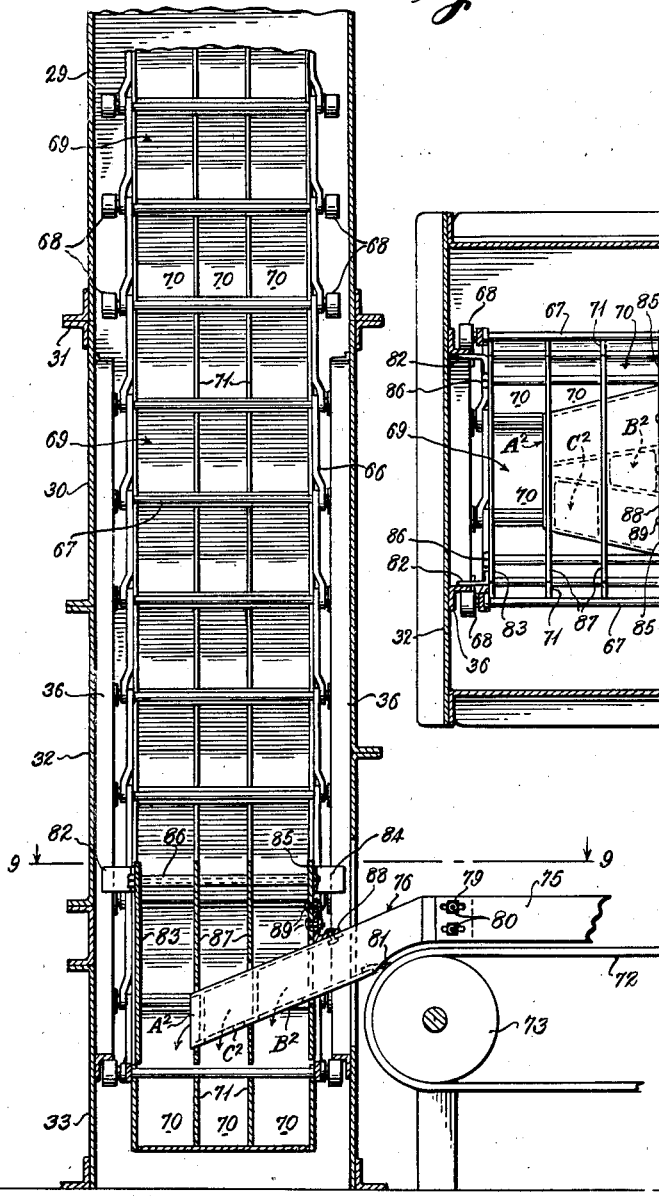
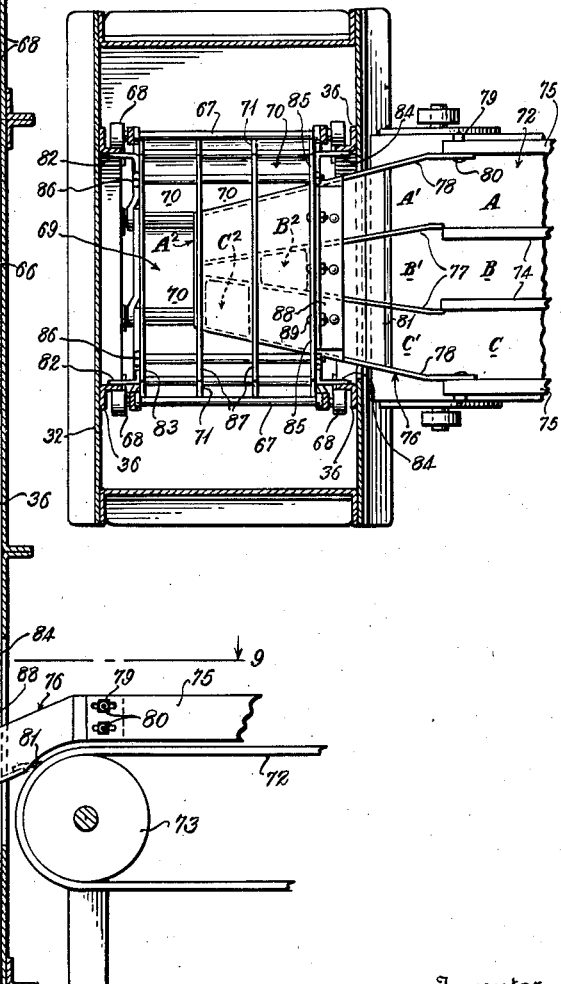
Inventor
Herbert E. Schrader
By L. Donald Myer, Attorney

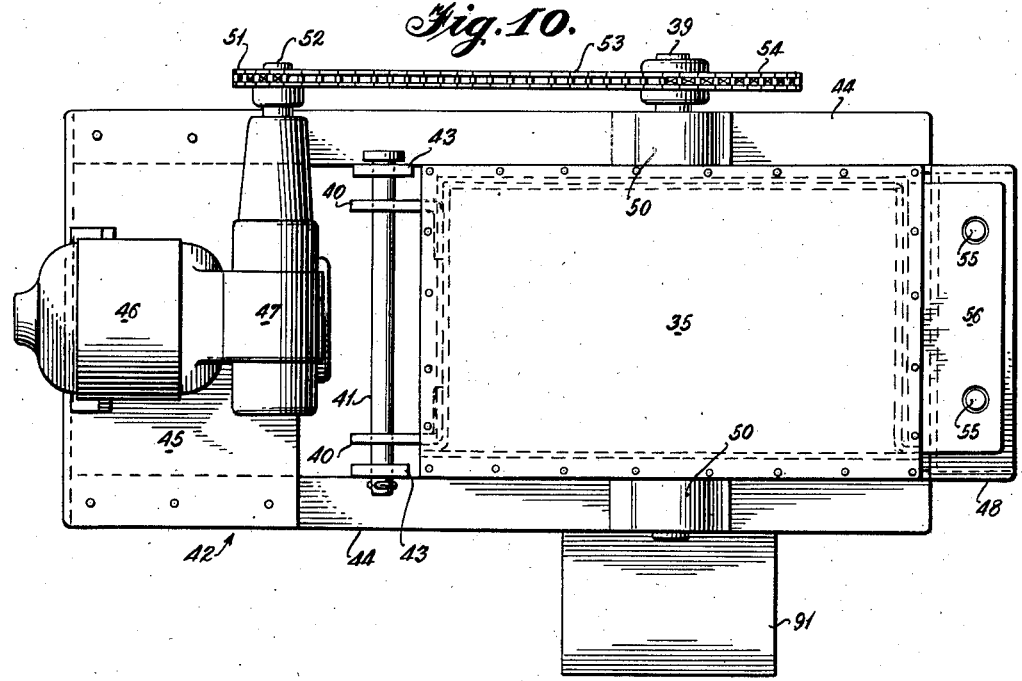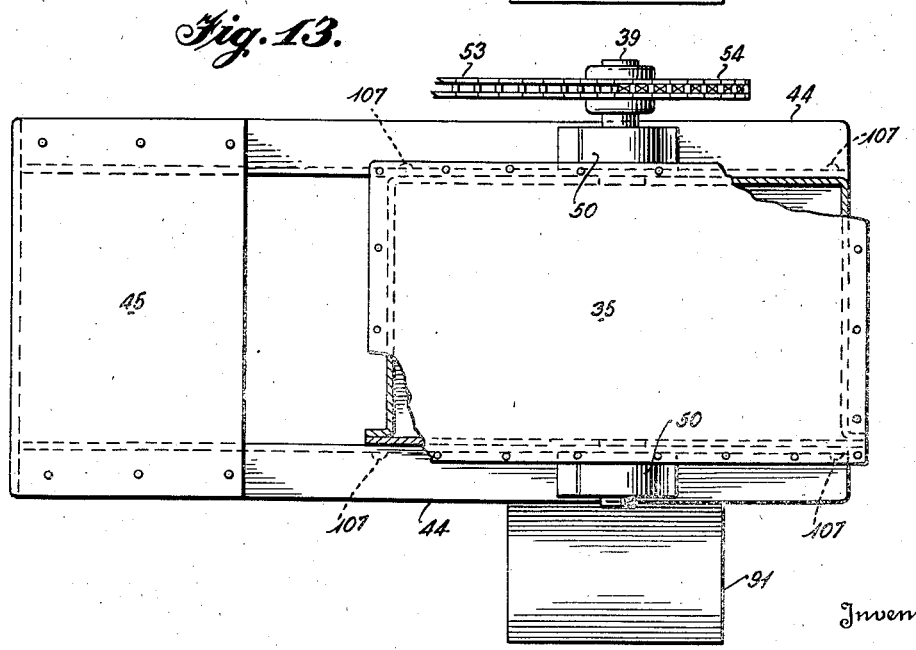

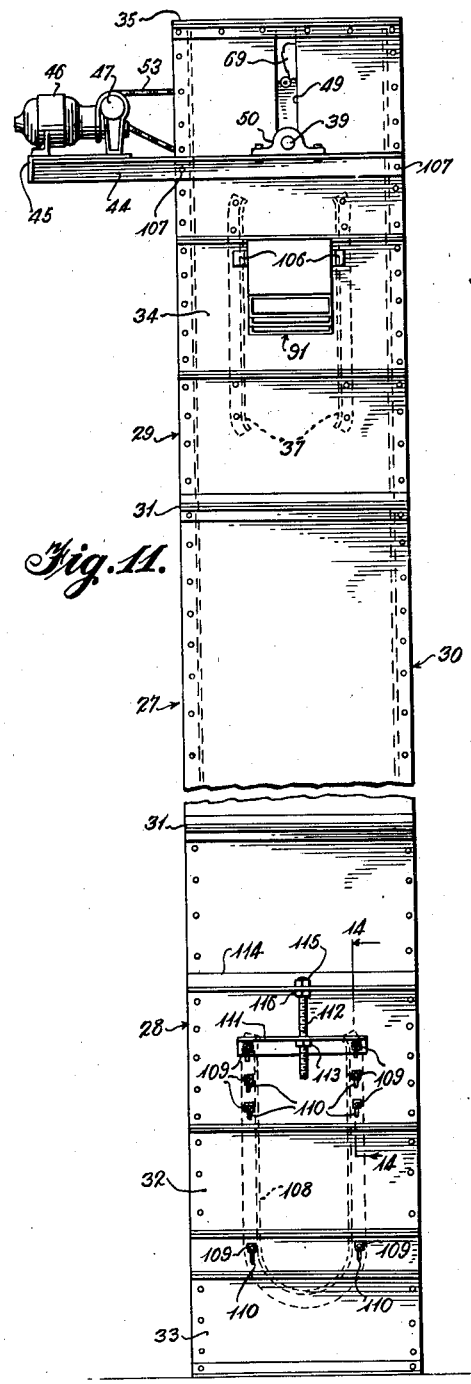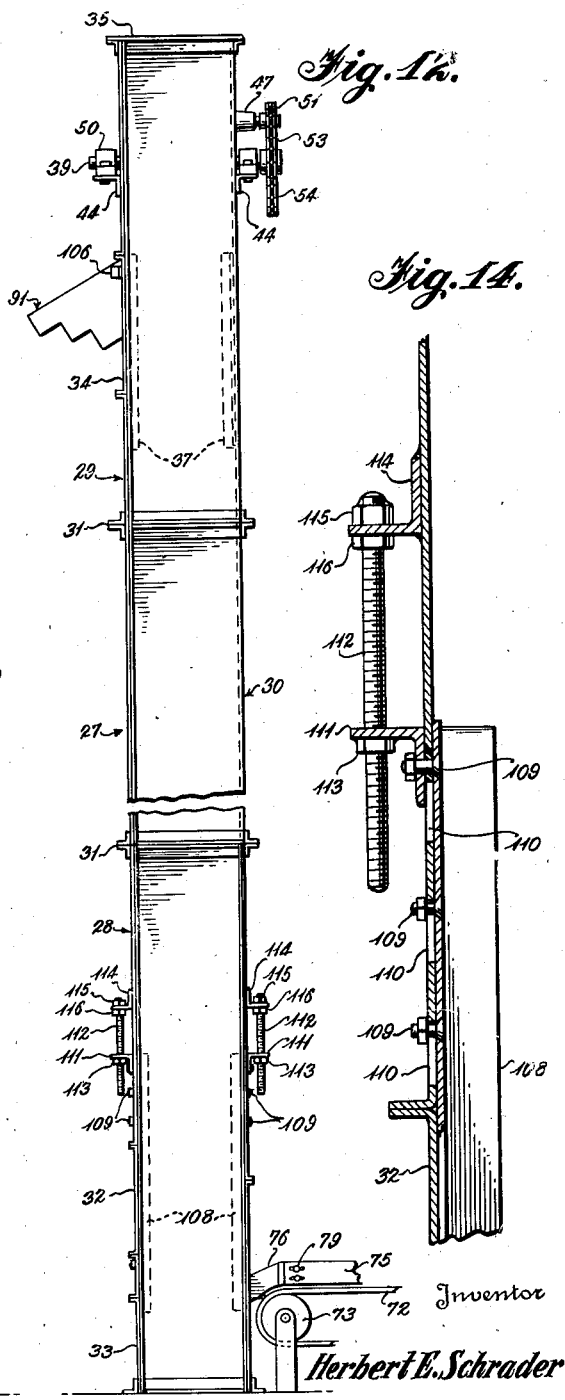

Inventor
Herbert E. Schrader

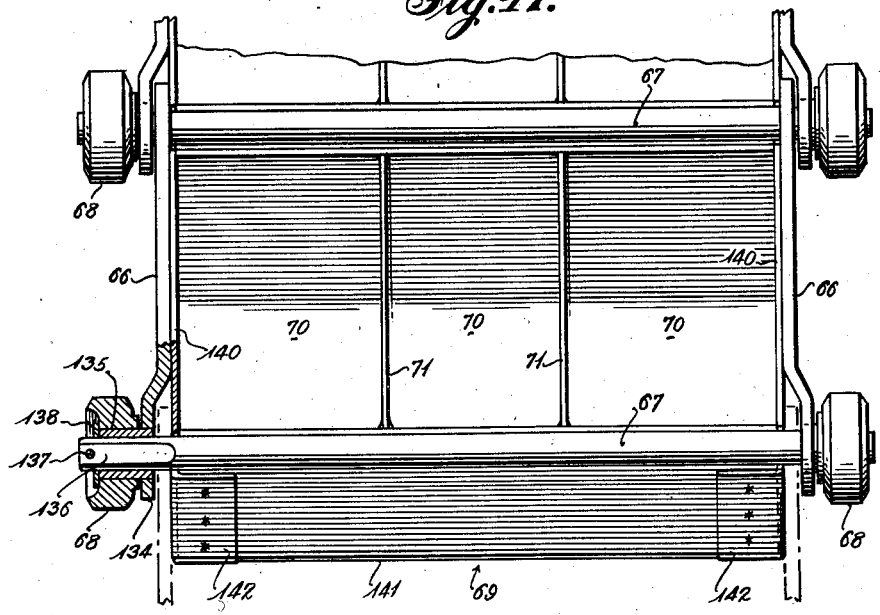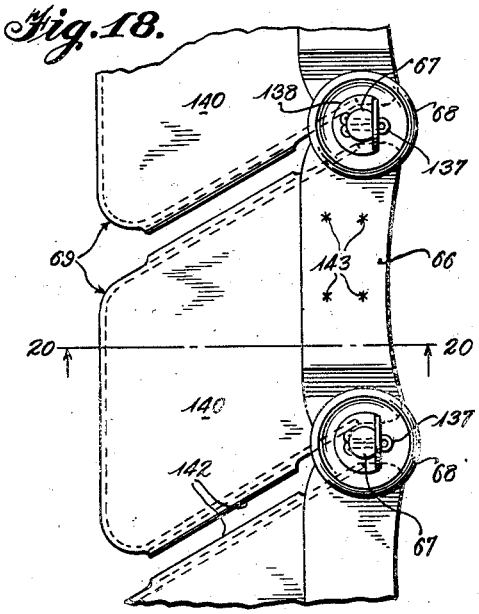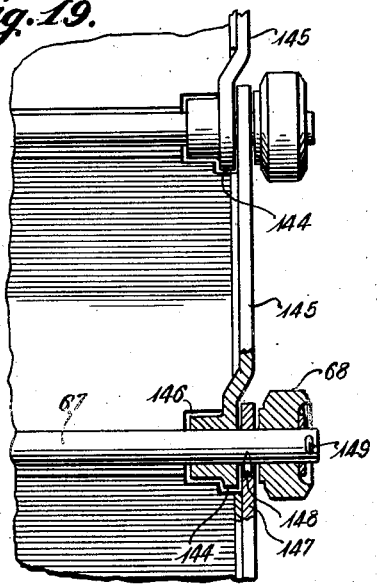

Feb. 12, 1946.   H. E. SCHRADER   2,394,638
ELEVATOR
Filed July 10, 1942    12 Sheets-Sheet 10
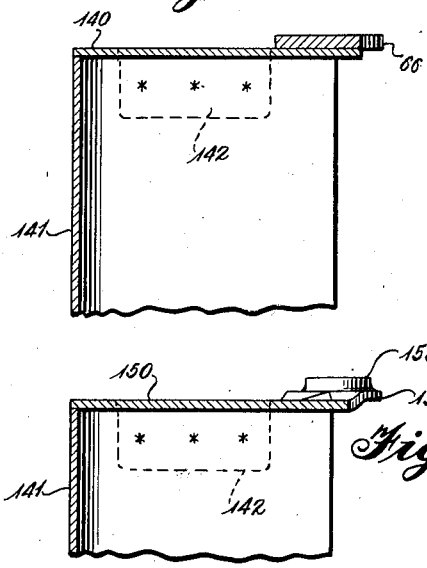
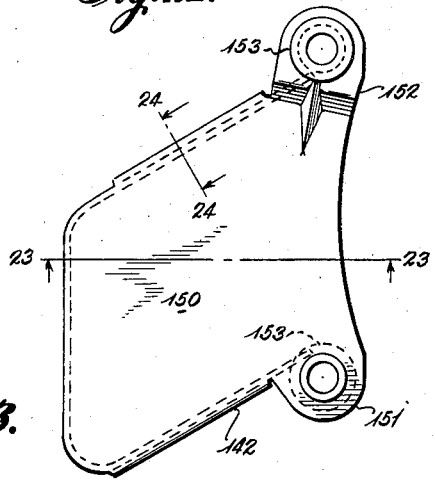
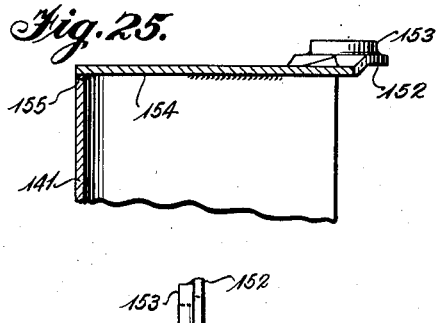
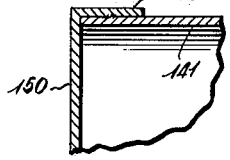
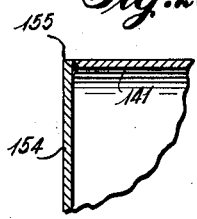
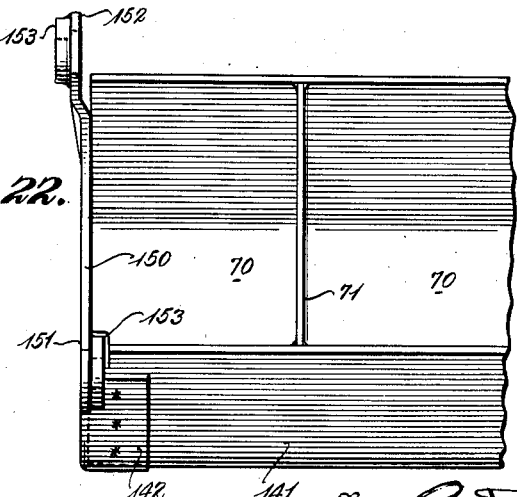
Inventor
Herbert E. Schrader

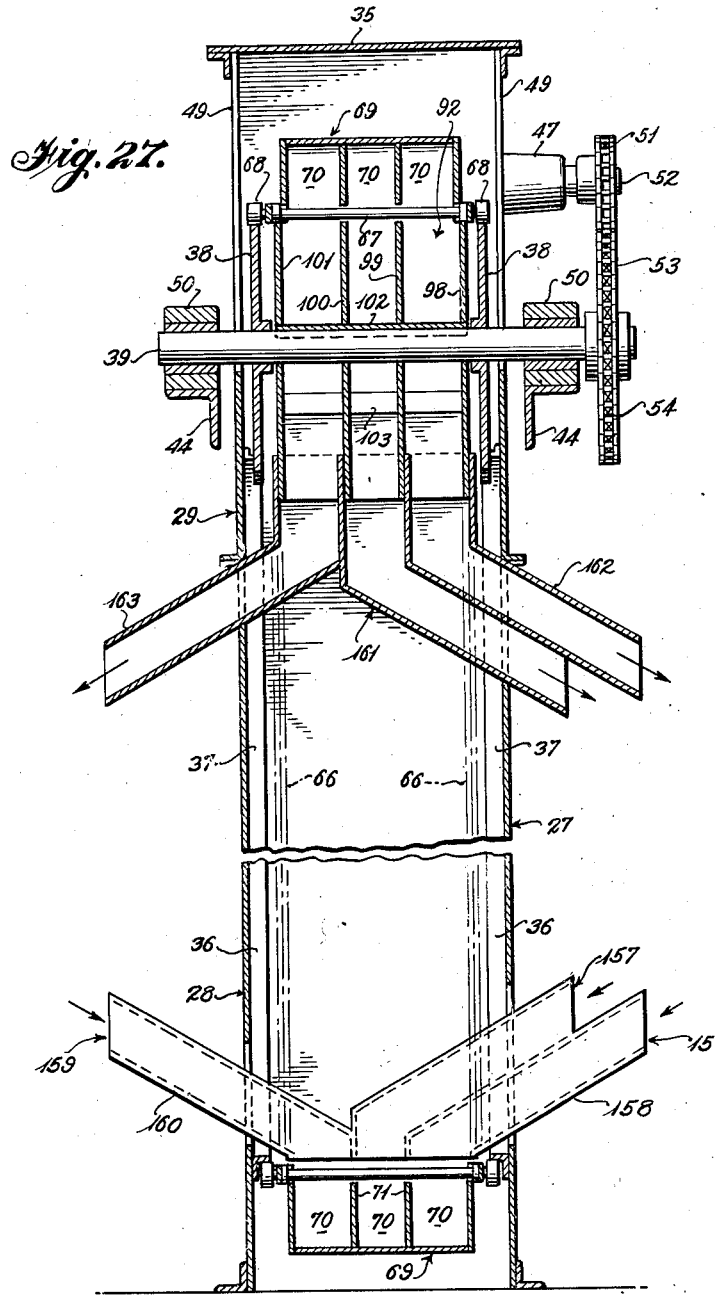

Feb. 12, 1946. H. E. SCHRADER 2,394,638
ELEVATOR
Filed July 10, 1942 12 Sheets-Sheet 12

Inventor
Herbert E. Schrader
By R. Donald Myers
Attorney

Patented Feb. 12, 1946

2,394,638

UNITED STATES PATENT OFFICE 2,394,638

ELEVATOR

Herbert E. Schrader, Elgin, Ill., assignor to Link-Belt Company, a corporation of Illinois Application July 10, 1942, Serial No. 450,433

24 Claims. (Cl. 198—45)

This invention relates to new and useful improvements in elevators.

The primary object of this invention is to provide apparatus for elevating, or transporting in a generally upward direction, without being mashed or otherwise damaged either in transit or during feeding or discharging, relatively small, manufactured articles or objects which, because of their size, irregular shape, structural thinness, hollow construction, etc., and/or the materials from which they are formed, cannot be handled safely by conventional elevating equipment.

A further important object of the invention is to provide apparatus of the above mentioned type which, although it transports the objects or articles by means of buckets, eliminates all danger of the objects becoming jammed between buckets and stationary casing parts or becoming crushed by digging of the buckets into a mass or pile of said objects because of employing feeding means which places or pours the objects directly into the buckets.

Another object of the invention is to provide a bucket type of elevator wherein more than one kind or size of object or article can be handled simultaneously without mixing, and wherein feeding to and discharging from the apparatus may be accomplished from either side or both sides thereof, with the point of feed being at such a reduced distance relative to the base of the unit that it is seldom necessary to provide a pit in the floor to receive the foot portion of the elevator casing.

Other objects and advantages of the invention will be apparent during the course of the following description.

Figure 3:
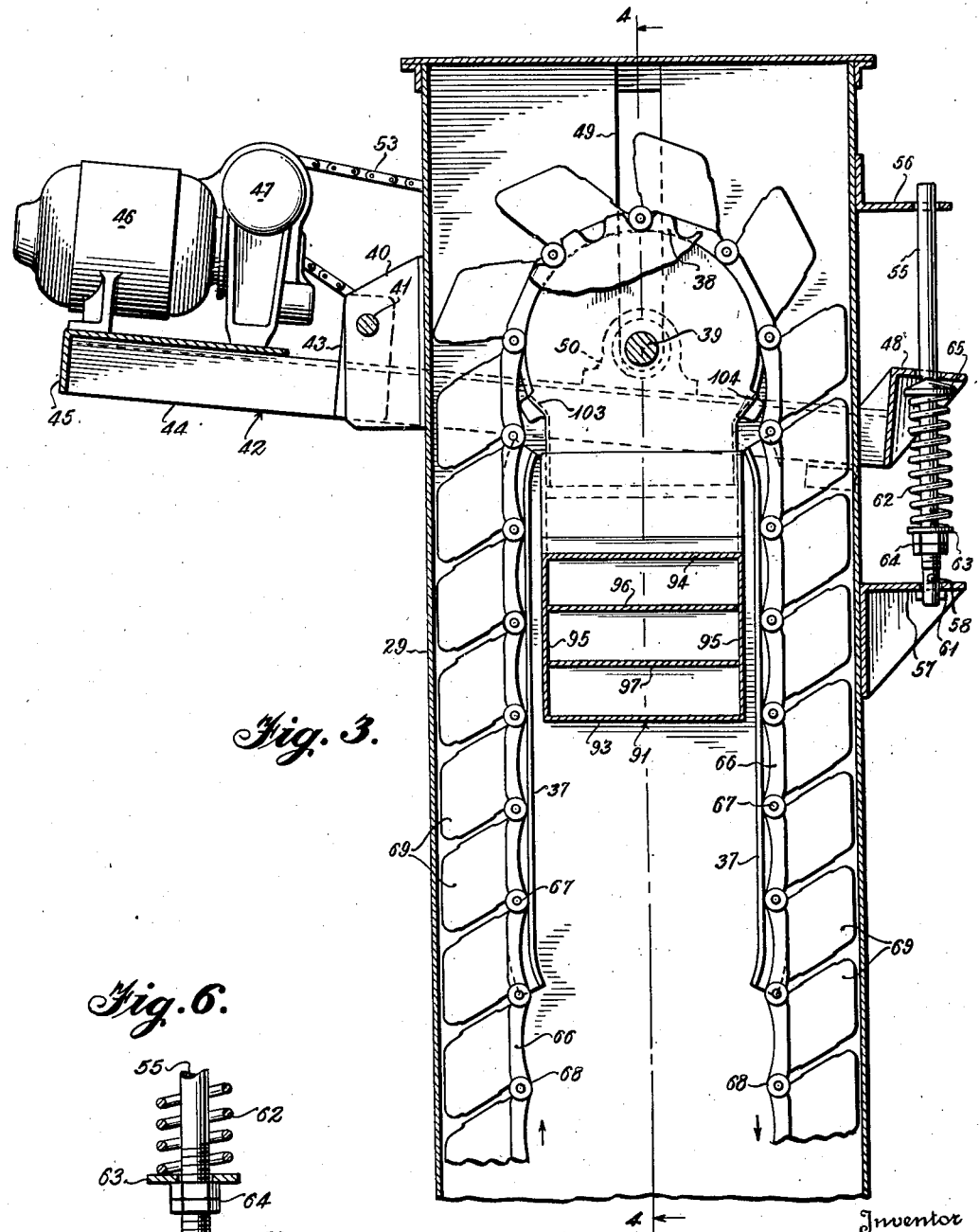
Figure 6:
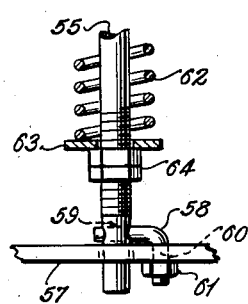
Figure 7:
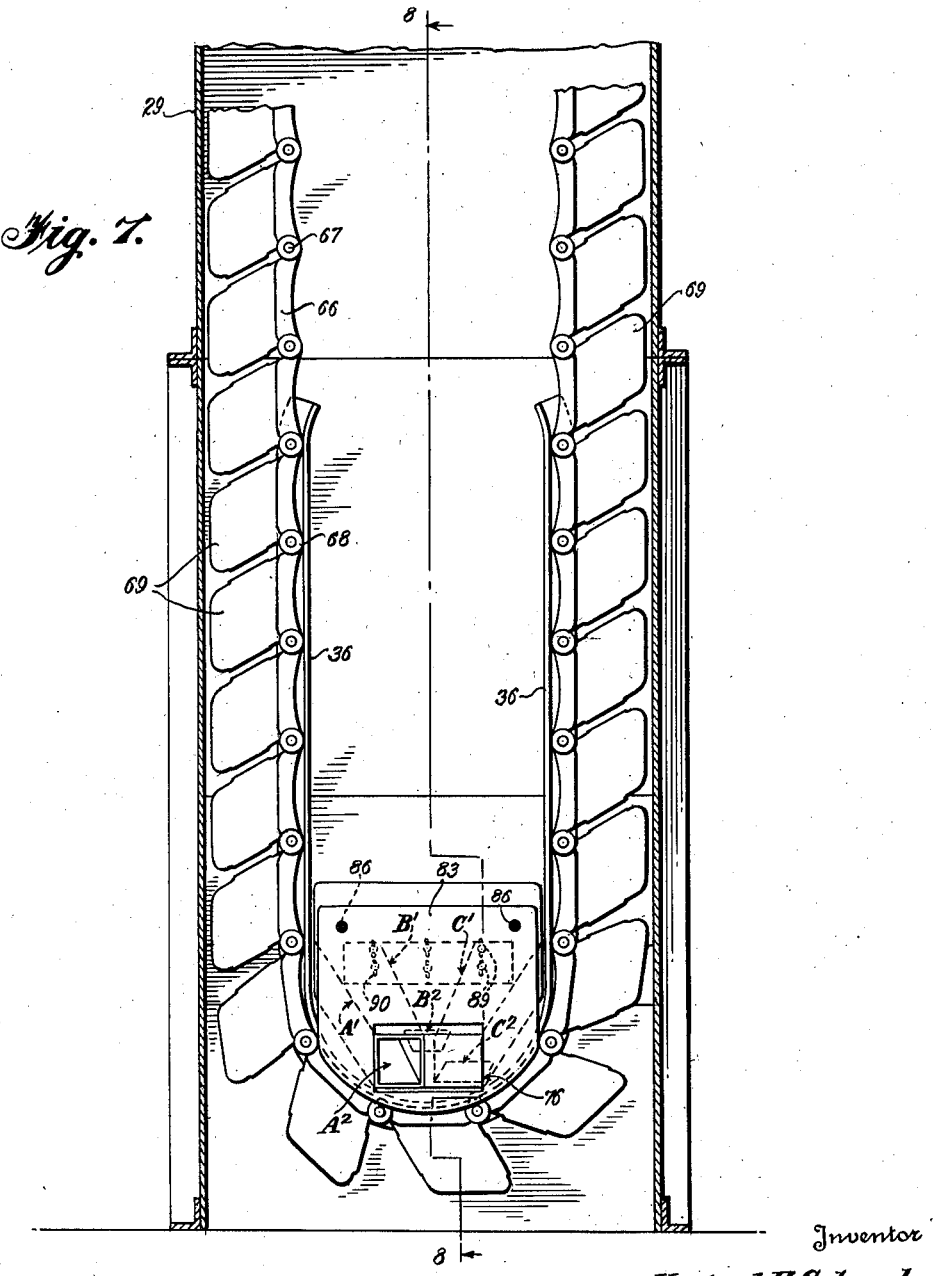
Figure 15:
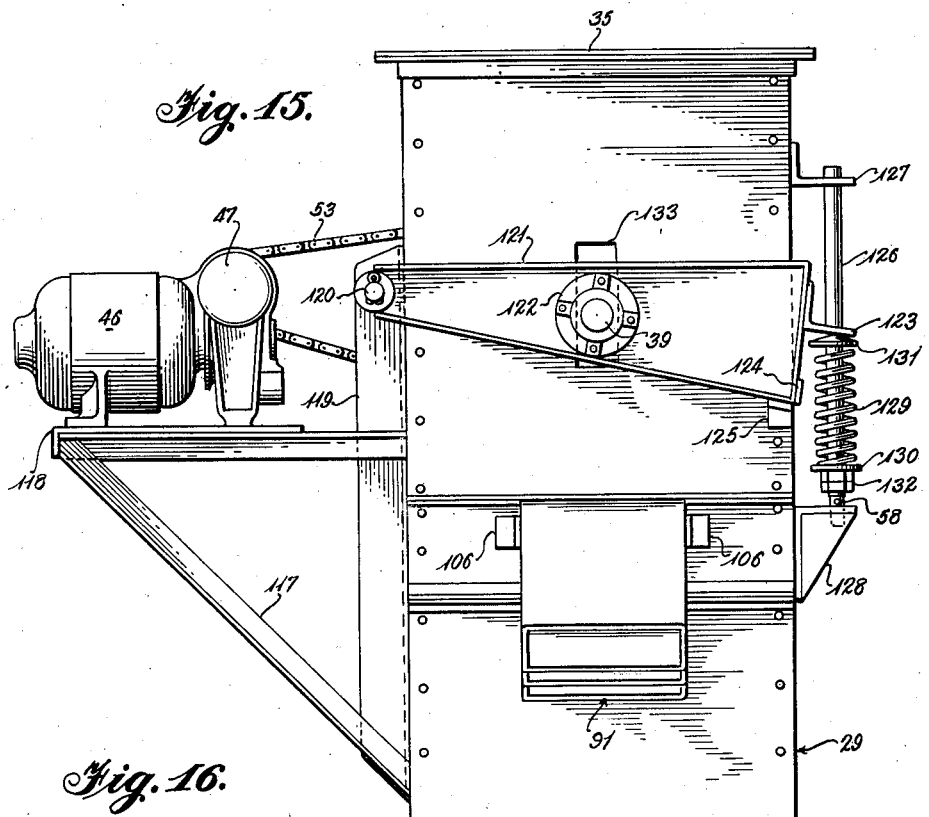
Figure 16:
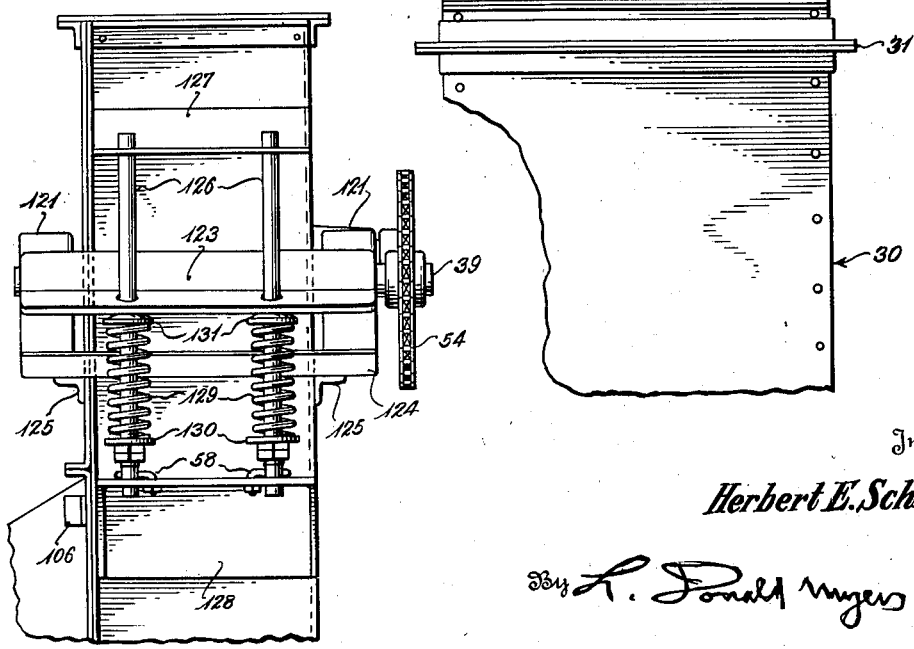
Figure 28:
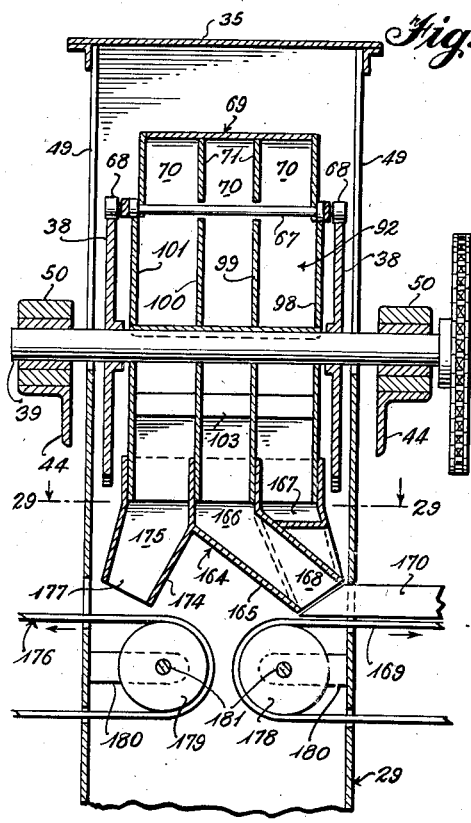
Figure 30:
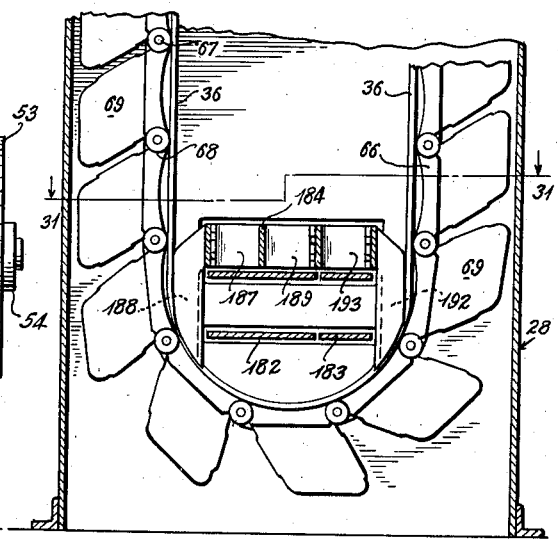
Figure 29:
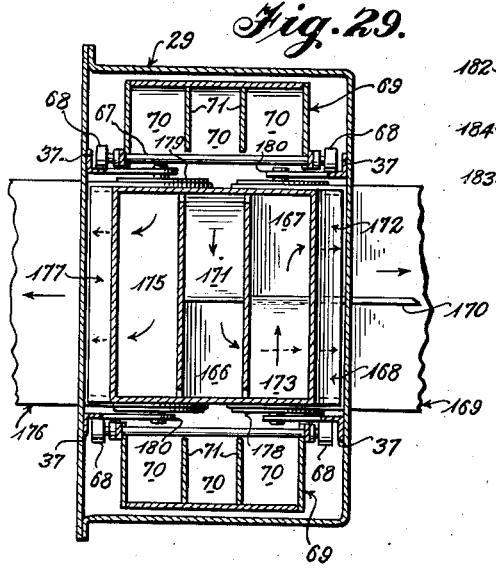
Figure 31:
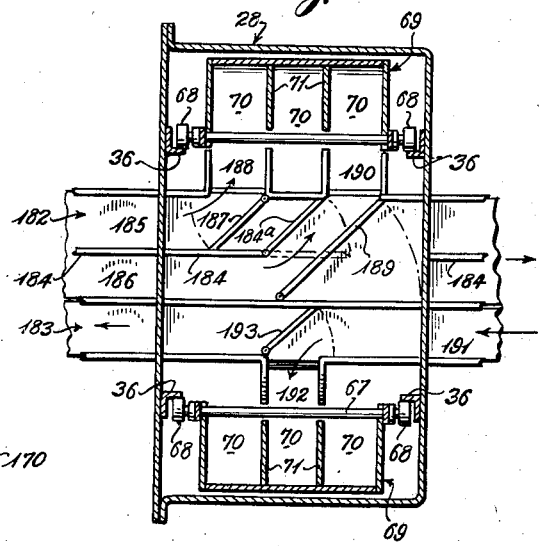

In the accompanying drawings forming a part of this specification and in which like numerals are employed to designate like parts throughout the same, Figure 1 is a side elevational view of the preferred form of elevator embodying this invention, Figure 2 is a similar view to Fig. 1 but taken at right angles thereto, Figure 3 is an enlarged, vertical sectional view taken on line 3—3 of Fig. 2, Figure 4 is an enlarged vertical sectional view taken on line 4—4 of Fig. 3, Figure 5 is a horizontal sectional view taken on line 5—5 of Fig. 4, Figure 6 is a detail elevational view of a portion of the spring take-up mechanism which is employed for maintaining the elevator chain or transmission member properly tensioned, Figure 7 is enlarged, vertical sectional view taken on line 7—7 of Fig. 2, Figure 8 is an enlarged vertical sectional view taken on line 8—8 of Fig. 7, Figure 9 is a horizontal sectional view taken on line 9—9 of Fig. 8, Figure 10 is a top plan view of the elevator apparatus disclosed in the preceding figures, Figure 11 is a side elevational view of a slightly modified form of elevator apparatus, Figure 12 is a similar view to Fig. 11 but taken at right angles thereto, Figure 13 is a top plan view of the elevator apparatus of Figs. 11 and 12 but with the prime mover removed, Figure 14 is a detail vertical sectional view taken on line 14—14 of Fig. 11, Figure 15 is an enlarged elevational view of an elevator casing head section with a modified form of take-up mechanism for the head shaft and its conveyor chain wheels or sprockets, Figure 16 is a similar view to Fig. 15 but taken at right angles thereto, Figure 17 is a detail elevational view of an elevator chain and bucket assembly in which the buckets are secured at their opposite sides to the side bars of the chains, Figure 18 is a side elevational view of the elevator chain and bucket assembly shown in Fig. 17, Figure 19 is a fragmentary elevational view of an elevator chain and bucket assembly in which a slight modification of the elevator chain side bar construction is disclosed, Figure 20 is a detail sectional view of a bucket which is taken substantially on line 20—20 of Fig. 18, Figure 21 is a side elevational view of a modified form of elevator bucket which may be employed in place of the bucket structure shown in Figs. 17 and 18 and in which case the buckets are not directly secured to the side bars of the elevator chains, Figure 22 is a fragmentary elevational view of the bucket shown in Fig. 21 but taken at right angles thereto, Figure 23 is a fragmentary sectional view taken substantially on line 23—23 of Fig. 21, Figure 24 is a fragmentary sectional view taken on line 24—24 of Fig. 21, Figure 25 is a fragmentary sectional view of a slightly modified form of elevator bucket, Figure 26 is a fragmentary sectional view of the form of bucket shown in Fig. 25, Figure 27 is a vertical sectional view, partly broken away, of a modified form of elevator in which the feed and discharge spouts are associated with both sides of the elevator head and foot portions, Figure 28 is a vertical sectional view of the head portion of a modified form of elevator in which the discharge spouts pour the transported objects on to two belts which are traveling in opposite directions relative to the opposite sides of the casing, Figure 29 is a horizontal sectional view taken on line 29—29 of Fig. 28, Figure 30 is a vertical sectional view of the foot portion of a modified form of elevator in which the objects to be transported approach the elevator from opposite sides on belt conveyors which pass through the lower loop of the endless series of articulated buckets, and Figure 31 is a horizontal sectional view taken on line 31—31 of Fig. 30.

In the drawings, wherein for the purpose of illustration are shown the preferred and other embodiments of the invention, and referring first to Figs. 1 and 2, the reference character 27 designates in its entirety the elevator casing. This casing is made up of a foot section 28, a head section 29, and one or more intermediate sections 30. These various sections are suitably interconnected at their adjacent ends by suitable attaching flanges 31. Preferably, although not necessarily, the foot sections 28 and the head sections 29 are made of standard sizes for the various elevators of a given capacity. The intermediate section or sections 30, however, may be made of different lengths so that elevators of different heights can be assembled by employing intermediate sections of proper lengths. The foot section 28 and head section 29 are adapted to be reversibly connected to their respective ends of the intermediate sections 30. This reversible characteristic is provided so that the feeding of objects or articles to and the discharging of the same from the elevator may take place on the same or opposite sides of the latter. It will be disclosed at a later point, and in connection with modified forms of elevators, that the feeding and/or the discharging of objects may take place on both sides of the elevator casing simultaneously.

The foot section 28 is provided with two removable panels 32 and 33 to allow for inspection of the interior of the lower portion of the casing. The head section 29 is provided with a removable panel 34 for inspection of the interior of this portion of the elevator casing. A removable cover plate 35, also, is provided for inspection purposes.

Figs. 1 and 7 to 9 inclusive disclose the foot section 28 of the casing as having secured to its fixed or permanent wall portions the substantially U-shaped guides 36 over which travel the rollers that are mounted on the opposite ends of the elevator chain pins. This use of the guides 36 and the chain pin rollers eliminates the need for foot wheels or sprockets to guide the chains and buckets. This assembly, also, permits the articles or objects to be transported to be fed by gravity directly into the inwardly opening buckets.

Figs. 1 and 3 to 5 inclusive disclose opposite walls of the casing head section 29 as having secured to the inner surfaces thereof the four elevator chain guides 37. These guides control the path of movement of the chains and the buckets in approaching and leaving the head wheels or sprockets 38 that are carried by the head shaft 39.

In the preferred form of elevator assembly shown in Figs. 1 to 10 inclusive, proper tension is maintained on the elevator chains by means of take-up mechanism that supports the head shaft 39. This take-up mechanism is best illustrated in Figs. 1 to 4 inclusive and 10.

Figs. 1, 3 and 10 best illustrate one side wall of the head section of the casing as having suitably attached thereto the angle brackets 40. These brackets have aligned openings for receiving the pivot shaft 41.

A rectangularly shaped frame 42 is pivotally supported on the shaft 41 by means of the two upstanding bracket arms 43 attached to the opposite side angles 44 of the said rectangular frame 42. This frame is further formed by the plate 45 which is connected at its opposite ends to the side frame angles 44. This plate 45 forms one transverse end portion of the rectangular frame 42 and additionally functions as a support for the prime mover 46, which can be an electric motor, and its right angle worm gear reduction unit 47. The remaining transverse end portion of the rectangular frame 42 is formed by the angle plate 48. The various parts 43, 44, 45 and 48 of the rectangular frame are suitably attached to each other, as by welding, or the like, to provide a completely prefabricated unit which is pivotally attached to the elevator casing by the pivot shaft 41.

The head shaft 39 passes through the vertical slots 49, formed in opposite side walls of the casing head section 29, for being journaled in the anti-friction bearing blocks 50 that are suitably mounted on the side angles 44 of the rectangular frame 42. A drive sprocket 51 is suitably keyed to the shaft 52 of the reduction unit 47 and this drive sprocket has trained thereover a suitable roller chain 53 that in turn is trained over the driven sprocket 54 suitably keyed to the head shaft 39. It will be appreciated that with both the prime mover 46 and the head shaft 39 mounted on the same frame 42, this frame can partake of pivotal movement without in any way affecting the tension on the drive chain 53.

The spring take-up for the head shaft 39 and its supporting frame 42 is best illustrated in Figs. 1, 2, 3 and 10. This take-up includes a pair of parallel rods 55 which pass through suitable openings formed in the end bracket 48 of the frame 42, and the upper and lower casing brackets 56 and 57 respectively. Figs. 3 and 6 disclose the means employed for retaining these take-up rods 55 against longitudinal movement. This means consists of an angularly bent pin 58 for each rod. One branch of this pin passes through an aperture 59 formed in the lower end of its rod 55. The remaining branch of each pin passes through an aperture 60 in the casing bracket 57 and has a nut 61 threaded on its outer end. This nut, of course, prevents the withdrawal of the retaining pin 58 from the aperture 60 of the bracket 57. The horizontally extending branch of the pin 58, by entering the aperture 59 of the take-up rod 55, holds the rod against axial displacement.

Each take-up rod has threaded thereon a take-up spring 62. The lower end of each spring bears against a thrust washer 63 which is adjustable longitudinally of its rod 55 to vary the degree of compression of the spring. This thrust washer is adjusted by means of the lock nuts 64 that are threaded on the take-up rod 55. The upper end of each take-up spring 62 bears against a thrust plate or cap 65 which is of convex shape on its top surface to properly engage the end bracket 48 of the frame 42 regardless of the angular position of this frame relative to the respective take-up rods 55.

From the above description of the take-up mechanism, it will be appreciated that the rectangular frame 42 can be caused to assume different angular positions by adjusting the take-up nuts 64 relative to the rods 55 to vary the compression force of the springs 62. This take-up mechanism, therefore, will at all times maintain the elevator chains properly tensioned.

Figs. 3 to 5 inclusive and 7 to 9 inclusive disclose in considerable detail the elevator chains with the endless series of overlapping, inwardly opening buckets. This transporting mechanism will be partially described in detail in connection with these figures while more complete descriptions will be given at a later point when Figs. 17 to 26 inclusive are specifically referred to.

It will be noted that the transmission mechanism includes the parallel chains 66 that are formed of offset side plates which are properly connected by the chain pins 67. Figs. 4, 5, 8 and 9 clearly show each chain pin 67 as serving both chains. The outer ends of each chain pin 67 have mounted thereon the rollers 68 which cooperate with the various guides 36 and 37 as well as the teeth of the head wheels or sprockets 38 for controlling the direction of movement of the elevator chains, and the buckets, and for reducing the power required to drive this transporting mechanism.

The endless series of overlapping, inwardly opening buckets 69 are arranged between the parallel strands of chain and are so positioned that the mouth or opening of each bucket is framed by an adjacent pair of chain pins 67 and the two chain side bars 66 which are connected by these two pins.

Figs. 3 and 7 collectively disclose the buckets as being so shaped and manipulated that they will be capable of receiving their loads while traveling around the lower loop which is defined by the U-shaped guides 36; that they will be capable of transporting the desired articles or objects along the up path or run without spilling; and that they will discharge by gravity while passing over the head wheels 38.

Figs. 4, 5, 8 and 9 disclose each one of the buckets as being formed into three pockets 70 by means of the partitions 71. This multiple pocket or compartment formation of the buckets is particularly desirable when the elevator is employed for transporting simultaneously several different kinds of articles or objects without mixing them. For example, when three pockets or compartments are formed in each bucket, three different kinds of articles or objects can be transported by being delivered to the three different pockets or compartments. Naturally, the buckets can be provided with one partition 70 when only two pockets or compartments are required while any desired larger number of pockets or compartments can be produced by employing more than two partitions for each bucket. It will be further obvious that the partitions may be entirely dispensed with so that each bucket will provide only one pocket or compartment. Even though the buckets are divided up into a plurality of pockets or compartments by partitions, it will be obvious that the elevator may still be employed for transporting only one type or kind of article or object by delivering the same article into all of the compartments of all of the buckets.

Because the buckets are illustrated in the several figures being described as being provided with a plurality of pockets or compartments 70, the article or object feeding and discharging mechanisms have been illustrated as being of proper construction to handle, without mixing, a like number of different articles or objects. It will be understood, however, that the feeding and discharging mechanisms readily may be modified to properly cooperate with the buckets that are provided with a greater or a lesser number of pockets or compartments. Such modifications of the feeding and discharging mechanisms are fully contemplated and will be readily understood by those skilled in the art.

The feeding mechanism first will be described in connection with the disclosures of Figs. 2 and 7 to 9 inclusive.

The articles or objects to be elevated are carried to the base of the elevator by means of the feeder belt 72 which is trained around a head pulley 73 at its discharge end. The articles or objects are maintained separated in three paths or lanes A, B and C, see Fig. 9, by means of the separator strips 74 and the side boards 75. The three lanes of the feeder belt communicate with the three lanes A', B' and C' of the feed spout 76. This spout is formed into its lanes by the partitions 77 and the side boards 78. The feed spout lane A' discharges from its outer open end $A^2$ into the outer pocket or compartment of each bucket. In Figs. 7 and 8, this outer bucket pocket or compartment 70 is located at the left hand side of the elevator. The feed spout lane B' discharges through a bottom opening $B^2$ into the inner pocket or compartment 70 of each one of the buckets. This inner pocket or compartment is located on the right hand side of the elevator as viewed in Figs. 8 and 9. The feed spout lane C' discharges its articles or objects through a bottom opening $C^2$ into the intermediate pocket or compartment of each elevator bucket. In this way, the three lanes of different articles or objects are maintained separated as they are placed or poured into the separate pockets or compartments of the elevator buckets.

It will be appreciated that this multiple lane type of feed spout may be employed to advantage even though only one type of article or object is being transported and is being fed into buckets which are provided with only a single pocket or compartment because of the transverse distribution of the articles or objects which is provided by this spout construction.

Figs. 8 and 9 disclose the composite feed spout 76 as being adjustably connected to the side boards 75 of the feeder belt by means of bolts 79 which pass through slots 80. A scraper 81, formed of rubber or other suitable material, is associated with the feeder belt 72 and functions to prevent wedging of any of the articles, or portions thereof, between the belt as it passes over the head pulley 73 and the adjacent bottom portion of the spout.

Figs. 8 and 9 disclose brackets 82 which are secured to the inner sides of the U-shaped guides 36 and which function to support a plate 83 that registers vertically with the outer side walls of the buckets as they pass through the feeding zone. In other words, this plate 83 helps to deposit the articles or objects from the discharge end $A^2$ of the lane A into the outer or left hand pocket or compartment of each bucket.

Brackets 84 are attached to the U-shaped guide 36, on the side of the elevator casing adjacent the feeder belt 72, and function to support a plate 85 that registers vertically with the inner side walls of all of the buckets as they pass through the feeding zone. The plates 83 and 85 are interconnected at their upper ends by bolts or rods 86. These bolts or rods have spacers threaded thereon which are of proper length to properly space the additional plates 87 which register vertically with the partitions 71 of the buckets as they pass through the feeding zone. These plates 85 and 87 assist in assuring proper delivery of the different articles or objects to the different pockets or compartments of the buckets from the discharge openings $A^2$, $B^2$ and $C^2$ of the composite spout 76.

The spout is adjustably connected to the plate 85 by means of the angle 88 that is bolted or welded to the spout and is adjustably connected to the plate 85 by the screws 89 which pass through vertical slots 90 formed in the plate 85.

The discharge mechanism of the elevator is best illustrated in Figs. 1 to 5 inclusive. This discharge mechanism includes a fixed outer spout section, which is designated in its entirety by the reference character 91, and an inner, vertically adjustable spout section, which is designated in its entirety by the reference character 92.

The fixed, outer spout section 91 is of substantially box formation and includes the bottom wall 93, the top wall 94 and the opposite side walls 95. Each one of these walls is properly shaped to provide an angle or bend which will permit the inner portion of the spout section to terminate beneath the head shaft 39 with its open end pointing upwardly and to permit the outer portion to pass laterally through a suitable opening formed in the removable casing panel 34. Partition plates 96 and 97 are arranged in the spout, in parallelism with the top and bottom walls 94 and 93 respectively, to provide the desired three passages for receiving the three different types or kinds of articles or objects which are transported in a separated condition by the buckets from the feeding end to the discharging end of the elevator.

The upper or inner section 92 of the spout is made up of four parallel plates 98, 99, 100 and 101. These plates are maintained in proper spaced, parallel relation to each other by the three bracing strips 102, 103 and 104. Fig. 4 clearly illustrates the bracing strip 102 as being curved transversely and as resting on the head shaft 39. This bracing strip 102, therefore, supports the inner spout section on this shaft. The lower end of the inner spout section 92 is so shaped that it will telescope with the inner or upper end of the outer spout section 91, as is clearly illustrated in Figs. 3 and 4. This telescopic connection will permit the inner spout section to be adjusted with the head shaft 39 while the outer spout section is stationary with respect to the casing. The means for fixedly attaching the outer spout section to the casing takes the form of the angle members 105 and 106, see Figs. 4 and 5.

It will be appreciated that as the buckets 69 pass around the head sprockets 38 the different articles or objects carried in the separate pockets or compartments 70 of the buckets will be discharged by gravity into the spaces or lanes that are formed between the four parallel plates 98, 99, 100 and 101. These spaced plates will guide these articles from the pockets or compartments of the elevator buckets into the separate lanes or paths formed in the lower or fixed spout section 91. Any desired form of handling equipment may be employed for receiving the different articles or objects from the discharge end of the lower spout section.

As was explained in connection with the feeding mechanism, the multiple lane form of discharge mechanism may be found to be desirable for use when the buckets are each provided with only one pocket or compartment and the conveyor is transporting only a single article or object. The multiple lane discharge mechanism will maintain the articles or objects in three separate layers as their discharging path of travel changes from a truly vertical direction to a laterally inclining direction.

In Figs. 11 to 14 inclusive there is disclosed a modification of the take-up mechanism employed for tensioning the elevator chains. In this modification, the head shaft and its wheels are not adjustable. Instead the U-shaped guides that are located in the foot section of the casing, and which form the bottom loop in the transporting mechanism, are adjustable.

As many of the elements and structural features disclosed in Figs. 11 to 14 inclusive are the same as those disclosed in the preceding figures, the same reference characters will be employed for identifying these elements.

The prime mover 46, and its worm reduction unit 47, are mounted on the platform plate 45 which is connected to the projecting ends of the side angles 44. These angles, however, are rigidly fastened to the sides of the elevator casing by the bolts, or the like, 107. The head shaft 39 is mounted in the anti-friction bearing blocks 50 which are mounted on the portions of the angle frames that lie on opposite sides of the casing head section 29.

In the casing foot section 28 the U-shaped guides 108 are attached to the fixed panels of the foot section by means of the bolts and nuts 109 which pass through apertures formed in the guides 108 and through vertical slots 110 formed in the casing panel.

The uppermost securing bolts 109 for both arms of each U-shaped guide pass through angle bars 111 with the result that these bars are directly connected to the U-shaped guides. Each bar has its horizontal flange apertured to allow for the passage of a take-up screw 112. A take-up nut 113 is welded to the under face of the horizontal flange of each angle bar 111 and is axially aligned with the aperture in this bar flange that loosely receives the take-up screw. The upper end portion of the screw is rotatably received within an aperture formed in the horizontal flange of a second angle bar 114 which is welded to the outer surface of the fixed casing panel. An operating nut 115 is welded to the upper end of the take-up screw 112 and functions as a head for this screw which may be engaged by a suitable wrench to accomplish rotation of the screw. A lock nut 116 is threaded on the take-up screw beneath the upper angle bar 114.

To accomplish adjustments of the two U-shaped guides 108 to tension the chains of the transporting member, the nuts of the various screws 109 are first loosened and then the lock nuts 116 of the take-up screws 112 are backed away from the upper angle bars 114. The take-up screws 112 then may be rotated in either direction to bring about the desired raising or lowering of the U-shaped guides 108. After these guides are properly positioned, the lock nuts 116 are again tightened to prevent rotation of the take-up screws and the nuts on the various bolts 109 are tightened to retain the guides 108 in their adjusted positions.

In Figs. 15 and 16 there is disclosed a modified take-up for the head shaft and its head wheel.

In this modification the prime mover 46 and its worm gear reduction unit 47 are held stationary with respect to the elevator casing head section 29 while the head shaft 39 is adjusted by the take-up.

In Fig. 15 there is illustrated one of a pair of parallel brackets 117 which are suitably attached to the side walls of the casing head section 29. These two brackets are interbraced by the platform producing plate 118 which supports the prime mover 46 and its reduction unit 47. The said brackets 117 are each provided with an upstanding arm 119 and these two arms support the pivot shaft 120 which extends horizontally of the casing.

A take-up lever 121 is arranged on each side of the casing head section 29. The inner ends of these levers are pivotally connected to the shaft 120. Intermediate the ends of each lever there is attached thereto a suitable anti-friction bearing block 122. These bearing blocks support the head shaft 39.

The free ends of the take-up levers 121 are interconnected by an angle bar 123. A second bracing strip 124 also interconnects the free ends of the levers 121. Suitable stops 125 are fastened to the opposite sides of the casing head section for limiting the downward swinging movement of the take-up lever assembly.

The angle bar 123 is suitably apertured to pass the take-up rods 126. The upper ends of these rods are received in suitable apertures formed in the angle strip 127 which is suitably fastened to the side of the casing head section. The lower ends of the take-up rods are anchored to the bracket 128 by the same type of fastening pin which is illustrated in detail in Fig. 6.

Each take-up rod 126 has threaded thereon a take-up spring 129 which bears against a thrust washer 130 at its lower end and against a thrust plate 131 at its upper end. Take-up nuts 132 are threaded on the lower portion of each take-up rod 126 and are employed to vary the compression force of the associated spring 129. The opposite walls of the casing are provided with vertical slots 133 to accommodate the vertical take-up movements of the head shaft 39.

Figs. 17, 18 and 20 disclose in detail the form of transporting chains and overlapping buckets which are illustrated in the elevator assembly of Figs. 3 to 5 inclusive and 7 to 9 inclusive.

As was pointed out above, the elevator chains are made up of the offset side bars 66 which are interconnected by the chain pins 67 that extend entirely across the transporting mechanism. The outside end 134 of each side bar has a bushing 135 properly secured in its pitch hole. Each one of these bushings acts as a bearing for the associated portion of the chain pin 67 and also acts as a bearing for the roller 68. The end portion of the chain pin received in each bushing 135 is flattened at one side, as at 136, and this flattened portion cooperates with a flattened portion of the pitch hole of the inside end of the next adjacent chain side bar for holding these inside end portions and the chain pins against relative rotation. A suitable cotter pin 137 passes through the extremity of the chain pin and cooperates with a thrust washer 138 for maintaining the roller 68 assembled on its supporting bushing 135.

The buckets of this assembly are made up of end pieces 140 and main body portions 141. The body portions are suitably shaped to provide the front, the rear and the bottom walls of the bucket. The end walls 140 are secured to the main body 141 by having ears 142 which are spot welded to the front and rear walls of the main body. In this form of the invention the end walls 140 are spot welded, as at 143, to the intermediate portions of the chain side bars 66. Therefore, each bucket and its two chain side bars constitute a rigid unit of the transporting mechanism.

A slight modification is illustrated in Fig. 19. In this modification the inside end 144 of each chain side bar 145 is formed with an integral boss or bushing 146 which rotatably receives the chain pin 67. The outside end 147 of each side bar is non-rotatably connected to the chain pin 67 by a locking pin 148. The roller 68 in this construction is directly journaled on the end portion of the chain pin and is held in place by the cotter pin 149.

Figs. 21 to 24 inclusive disclose a slight modification in the bucket construction. Instead of spot welding the end walls 150 to the chain side bars 66, each end wall is provided with two oppositely extending ears 151 and 152. Both of these ears are provided with pitch holes to receive the chain pins. The ear 151 is arranged in the plane of its end wall 150. The ear 152, however, is offset from this plane. Suitable bushings 153 are welded to the ears.

When this type of bucket is used, it is associated with the chain structure shown in detail in Figs. 17 and 18. The offset ears 151 and 152 are employed for hanging the buckets on the chain pins. For that reason, the buckets need not be welded to the side bars of the chain. The ears 151 and 152 of adjacent buckets overlap each other in the same manner as the inside ends and outside ends of offset chain side bars.

As the main body portion 141 of this type of bucket is the same as the main body portion of the bucket shown in Figs. 17, 18 and 20, the same reference character will be applied thereto.

Figs. 25 and 26 illustrate a still further modification of the bucket construction. In this form of the invention, the ears 142 are not provided on the end walls for attaching these end walls to the main body portion 141. The end walls 154 merely overlap the end edges of the main body 141 and are tack welded thereto, as at 155.

Fig. 27 discloses a modification of the form of the invention shown in Figs. 1 to 10 inclusive which deals with the feed and discharge spout structures. In the embodiment of the invention shown in Figs. 1 to 10 inclusive, the objects or articles handled by the elevator are all fed to the endless series of articulated buckets from one side and they are all discharged from one side. In the embodiment of the invention shown in Fig. 27, the articles or objects are fed to the elevators from both sides and they are discharged from both sides. As the only structural changes incorporated in the Fig. 27 embodiment deal with the feed spout structure and the fixed outer discharge spout section, all of the remaining structural elements that are disclosed and described in detail in connection with Figs. 1 to 10 inclusive are to be duplicated in this Fig. 27 embodiment. For the purpose of simplifying the disclosure of Fig. 27, all of these duplicated structural elements are not disclosed in detail. Those that are disclosed in detail have applied thereto the same reference characters that are employed for designating the same elements in Figs. 1 to 10 inclusive. Therefore, the detail description of these duplicated elements will not be repeated at this time.

The articles or objects to be elevated are carried to the base of the elevator casing by any suitable means. When three distinctly different types or kinds of articles are to be handled in a separated condition, these types of articles are delivered to the elevator in separate lanes or paths. Two of the different types of articles are delivered to the receiving ends 156 and 157 of the double passage branch 158 of the feed chute structure. The third type of article or object is fed to the receiving end 159 of the single passage branch 160 of the feed chute structure. The two passages of the double passage branch 158 deliver the objects to the right hand pockets and the intermediate pockets of the endless series of articulated buckets 69. The single passage branch 160 of the feed chute structure delivers its articles or objects to the left hand pockets or compartments of the elevator buckets. In this way, the different types of objects are maintained separated in the feed chute structure and are delivered to the different pockets or compartments of the buckets.

The fixed outer discharge spout section 161 cooperates with the inner vertically adjustable spout section 92 in the same manner as the fixed outer spout section 91 of the form of the invention shown in Figs. 1 to 9 inclusive. The fixed outer spout section 161, however, is formed with a double passage branch 162 that extends through one side wall of the elevator casing and a single passage branch 163 which extends through the opposite side wall of the elevator casing. It is clear from the disclosure of Fig. 27 that the double passage branch 162 receives the articles or objects that are spilled from two of the pockets or compartments of the buckets while the single passage branch 163 receives the articles or objects from the third pocket or compartment of each bucket.

Due to the reversible characteristics of the head casing section 29 and the foot casing section 28 of the elevator casing 27, it will be appreciated that the feed and discharge spout structures can be arranged so that the double passage branches 158 and 162 can either be arranged on the same side, as illustrated in Fig. 27, or on opposite sides of the elevator casing. Of course, the same is true with respect to the single passage branches 160 and 163.

Figs. 28 and 29 disclose a further modified form of discharge mechanism in which the articles or objects that have been elevated are discharged from both sides of the casing. In this form of the invention, however, conveyor belts running in opposite directions receive the articles that are spilled from the discharge ends of the spout passages which in turn receive the different types of articles or objects from the different pockets or compartments of the buckets 69.

The discharge spout structure 164 takes the place of the fixed outer spout section of previously described discharge mechanisms by cooperating in the same way with the inner vertically adjustable spout section 92. The branch 165 of the spout section 164 is formed with two passages 166 and 167. The passage 166 discharges its objects or articles through the open end 168 onto the active run of the conveyor belt 169. This discharge end 168 is equal in width to approximately one-half of the width of the belt 169. The objects or articles discharged onto this belt through the end 168 are maintained in their half portion of the belt by the partition 170 which extends lengthwise of the top run of the belt. The passage 166 is reduced to this half-belt width by the inclined bottom wall 171.

The passage 167 spills its objects or articles through the discharge end 172 onto the other half portion of the conveyor belt 169. The passage 167 is reduced to the half-belt width of its discharge end 172 by the sloping bottom wall 173.

The remaining branch 174 of the discharge spout section 164 has a single passage 175 which discharges onto the active upper run of the conveyor belt 176. Because this spout passage 175 is not required to share the width of the belt 176 with any other spout passage, the width of the discharge end 177 of the spout need not be reduced.

The two conveyor belts 169 and 176 are trained over head rolls 178 and 179 respectively which are located within the elevator casing. Suitable bearing brackets 180 are provided for supporting the shafts 181 of the belt rolls 178 and 179.

Figs. 30 and 31 disclose feed mechanism which will deliver the articles or objects to be elevated to both sides of the foot section 28 of the elevator casing. Two oppositely traveling belts 182 and 183 are provided for this purpose. These belts run entirely through the lower loop formed by the endless series of articulated links 66 and their buckets 69.

The belt 182 is divided by the partition 184 into two lanes or paths 185 and 186. The articles or objects traveling through the lane or path 185 are delivered into the left hand bucket compartments 70 by the gate 187 when it is in the full line position illustrated in Fig. 31. This gate will deflect the articles or objects into the spout 188 which spills into a bucket pocket or compartment. The gate or deflecting plate 187 may be swung into a position where it will close the entrance to the spout 188. The articles or objects carried through the path 185 by the belt 182 then will pass by the entrance to the spout 188.

The objects or articles carried through the path 186 by the belt 182 will be deflected into the right hand pockets or compartments of the buckets by the gate or deflector plate 189 when this gate or plate is arranged in its full line position. Cooperating with the gate or plate 189 is a hinged section 184a of the partition 184. When this partition extension 184a is in its full line position, it completes the path or lane 186 and delivers the articles traveling through this path into the spout 190 from which the articles spill into the right hand bucket pockets or compartments. The deflector gate or plate 189 and the hinged partition extension 184a may be swung into positions where they will extend lengthwise of the conveyor belt 182. When arranged in these longitudinally extending positions, the articles or objects traveling through the path or lane 186 will be carried on through the foot portion of the conveyor casing for delivery to some other elevator, not shown, which may be arranged in parallelism with the illustrated elevator. It is necessary, also, to swing the gate or plate 189 and the partition extension 184a into their longitudinally extending positions to permit the articles or objects to be carried through the elevator casing in the path or lane 185, as a result of swinging the gate 187 into the position where it will close the entrance to the spout 188.

The third type of article or object will travel through the path or lane 191 while being conveyed by the belt 183. The articles or objects in this lane 191 will be transferred into the spout 192 by the deflector gate or plate 193 when the said gate or plate is in its full line position of Fig. 31. This gate or plate may be swung into a position where it will close off the entrance to the spout 192, or into a position where it will extend lengthwise of the belt 183. When in this position, the articles or objects carried by the belt 183 will be moved entirely through the elevator casing for delivery to another elevator, or the like, not shown.

Without actually presenting specific disclosures of the same, persons skilled in the art will appreciate that the various types of feed and discharge mechanisms illustrated in the several independent figures may be employed in numerous different combinations. For example, the feed and discharge mechanisms of the form of the invention shown in Figs. 1 to 10 inclusive feed and discharge articles or objects to only one side of the elevator casing. Either of these mechanisms may be combined with the feeding or the discharging mechanisms of the embodiments shown in Figs. 27 to 31 inclusive so that the articles or objects may be fed to the elevator from one side and discharged from both sides or fed to the elevator from both sides and discharged from only one side. Additionally, the combined belt and spout type of feeding or discharging mechanisms of Figs. 28 to 31 inclusive may be combined with the purely spout types of feeding or discharging mechanisms disclosed in the remaining figures.

It is to be understood that the forms of this invention herewith shown and described are to be taken as the preferred examples of the same and that various changes in the shape, size, and arrangement of parts may be resorted to without departing from the spirit of the invention or the scope of the subjoined claims.

Having thus described the invention, I claim:

1. In an elevator of the type described, an endless series of articulated buckets, means for supporting said series of buckets to cause the same to travel a closed path with the path forming a foot loop and a head loop, said buckets opening toward the inside of their path, a feeding device passing into the foot loop and adapted to pour the objects to be transported directly into the buckets as they pass beneath said device, discharge means extending out of the head loop for receiving the objects as they are poured from the buckets in passing around the head loop of their path, take-up mechanism for maintaining the series of articulated buckets properly tensioned by adjusting the location of the foot loop of the bucket path, and means for adjusting the delivery portion of the feeding device to take care of take-up adjustments of the foot loops of the bucket path.

2. In an elevator of the type described, a head shaft, having a pair of spaced drive wheels, endless chains trained over said wheels to form a head loop, guides below the spaced drive wheels to loop the chains at the foot of the elevator, take-up mechanism to adjust the position of the head shaft for maintaining the chains properly tensioned, a series of buckets arranged outwardly of and attached to said chains, said buckets opening at the inside of their path of travel, a feeding device passing into the foot loop and adapted to pour the objects to be transported into the buckets as they pass beneath said device, and discharge means extending out of the head loop for receiving the objects as they are poured from the buckets in passing around the head drive wheels, said discharge means including relatively adjustable inner and outer portions with the inner portion being supported by and adjustable with the head shaft.

3. In an elevator of the type described, an endless series of articulated buckets, means for supporting said series of buckets to cause the same to travel a closed path with the path forming a foot loop and a head loop, said buckets opening at the inside of their path, a partitioned feeding spout having a plurality of openings through which to pour the objects to be transported directly into the buckets in a plurality of streams arranged transversely of the said bucket path as the buckets pass beneath the device and around the foot loop, and discharge means for receiving the objects as they are poured from the buckets in passing around the head loop of their path.

4. In an elevator of the type described, an endless series of articulated buckets, means for supporting said series of buckets to cause the same to travel a closed path with the path forming a foot loop and a head loop, said buckets opening toward the inside of their path, feeding devices passing into the foot loop from opposite sides thereof and adapted to pour the objects to be transported directly into the buckets as they pass beneath said device, and discharge means extending into the head loop from opposite sides of the bucket path for receiving the objects as they are poured from the buckets in passing around the head loop of the path.

5. In an elevator of the type described, a casing formed of a foot portion, an intermediate portion, and a head portion, a head shaft, having a pair of spaced drive wheels, passing through the casing head portion, endless chains trained over said wheels to form a loop in the head portion, guides in the casing foot portion to loop the chains, a series of buckets arranged between and attached to said chains, said buckets opening toward the inside of their path of travel, a feeding device passing into the loop portion and adapted to pour the objects to be transported into the buckets as they pass beneath said device, means for supporting the feeding device on the foot portion of the casing, a discharge spout extending into the head portion and upwardly into the loop of the bucket path between the spaced drive wheels for receiving the objects as they are poured from the buckets in passing around the head loop of the path, and means for supporting the discharge spout on the head portion of the casing and on the head shaft.

6. In an elevator of the type described, a casing formed of a foot portion, an intermediate portion, and a head portion, an endless series of articulated buckets adapted to travel a closed path in said casing with the path looping in both the foot portion and the head portion, said buckets opening toward the inside of their path, a feeding device passing into the foot portion and having partitions to guide the objects to be transported in a plurality of paths so that the objects will be deposited directly into the portions of the buckets which are spaced throughout the width of the bucket path as the buckets pass beneath the device, and a discharge spout extending into the head portion and upwardly into the loop of the bucket path for receiving the objects as they are poured from the buckets in passing around the head loop of the path.

7. In an elevator of the type described, a casing of substantially uniform internal diameter throughout its height and formed of a foot portion having a lateral feed opening, an intermediate portion, and a head portion having a lateral discharge opening, a head shaft, having a pair of spaced drive wheels, passing through the casing head portion above the discharge opening, endless chains trained over said wheels to loop above the discharge opening, guides in the casing foot portion to loop the chains beneath the feed opening, a series of buckets arranged outwardly of and attached to said chains, said buckets opening at the inside of their path of travel, a partitioned feeding spout passing through the feed opening and adapted to move the objects to be transported in a plurality of paths and having a plurality of discharge openings arranged so that the objects will be deposited directly into portions of the buckets which are spaced throughout the width of the bucket path as the buckets pass beneath the device, and a discharge spout extending through the lateral discharge opening and upwardly into the loop of the bucket path for receiving the objects as they are poured from the buckets in passing around the head loop of the path.

8. In an elevator of the type described, a casing formed of a foot portion having a lateral feed opening, an intermediate portion, and a head portion having a lateral discharge opening, an endless series of articulated buckets adapted to travel a closed path in said casing with the path looping below the feed opening and above the discharge opening, said buckets opening toward the inside of their path, a feeding device passing through the feed opening and adapted to pour the objects to be transported directly into the buckets as they pass beneath said device, and discharge means extending through the lateral discharge opening and upwardly into the loop of the bucket path for receiving the objects as they are poured from the buckets in passing around the head loop of the path, said discharge means being divided by partitions into a plurality of lanes which are superimposed in the portion of the discharge means which extends through the discharge opening.

9. In an elevator of the type described, a casing formed of a foot portion having a lateral feed opening, an intermediate portion, and a head portion having a lateral discharge opening, a head shaft, having a pair of spaced drive wheels, passing through the casing head portion above the discharge opening, endless chains trained over said wheels to loop above the discharge opening, guides in the casing foot portion to loop the chains beneath the feed opening, a series of closely positioned buckets arranged outwardly of and attached to said chains, said buckets having their mouths opening at the inside of their path of travel and being of the same area as the cross-sectional area of the buckets so that the inner margin of the bucket path is formed substantially entirely of bucket mouths, a feeding device passing through the feed opening and adapted to pour the objects to be transported into the buckets as they pass beneath said device, and discharge means extending through the lateral discharge opening and upwardly into the loop of the bucket path for receiving the objects as they are poured from the buckets in passing around the head loop of the path, said discharge means being divided by partitions into a plurality of lanes which are superimposed in the portion of the means which extends through the discharge opening.

10. In an elevator of the type described, a casing having a foot portion and a head portion, an endless series of articulated buckets adapted to travel a closed path in said casing with the path looping in the head portion and the foot portion, said buckets opening toward the inside of their path and being partitioned to provide a plurality of separated object receiving pockets, feeding conveyor means being constructed and arranged to carry the objects to be elevated to the buckets in a plurality of separate lanes equal in number to the number of pockets formed in each bucket, means for receiving the lanes of objects from the feeding conveyor means and delivering the objects from the different lanes into different pockets of the buckets as the buckets pass beneath the receiving means, and a multiple lane discharge spout extending into the head portion of the casing for receiving and maintaining separated the objects as they are poured from the different pockets of the buckets in passing around the head loop of their path.

11. In an elevator of the type described, a casing having a lateral feed opening in its foot portion and a lateral discharge opening in its head portion, an endless series of articulated buckets adapted to travel a closed path in said casing with the path looping below the feed opening and above the discharge opening, said buckets opening toward the inside of their path and being partitioned to provide a plurality of separated object receiving pockets, means for feeding objects, in a plurality of separate lanes equal in number to the number of pockets in each bucket, into the casing through the feed opening for pouring the objects into the said pockets as the buckets pass beneath said means, and a multiple lane discharge spout extending through the discharge opening of the casing for receiving and maintaining separated the objects as they are poured from the different pockets of the buckets in passing around the head loop of their path.

12. In an elevator of the type described, a casing having a lateral feed opening in its foot portion and a lateral discharge opening in its head portion, an endless series of articulated buckets adapted to travel a closed path in said casing with the path looping below the feed opening and above the discharge opening, said buckets opening toward the inside of their path and being partitioned to provide a plurality of separated object receiving pockets, a feeding conveyor extending to a point adjacent the feed opening of the casing and being constructed to carry the objects to be elevated in a plurality of separate lanes equal in number to the number of pockets formed in each bucket, a multiple lane feeding spout for receiving the lanes of objects from the feeding conveyor and delivering the objects from the different lanes into different pockets of the buckets as the buckets pass beneath the spout, and means extending through said discharge opening for receiving and maintaining separated the objects as they are poured from the different pockets of the buckets in passing around the head loop of their path.

13. In an elevator of the type described, a casing having a lateral feed opening in its foot portion and a lateral discharge opening in its head portion, an endless series of articulated buckets adapted to travel a closed path in said casing with the path looping below the feed opening and above the discharge opening, said buckets opening toward the inside of their path and being partitioned to provide a plurality of separated object receiving pockets, means for feeding objects, in a plurality of separate lanes equal in number to the number of pockets in each bucket, into the casing through the feed opening for pouring the objects into said pockets as the buckets pass beneath the said means, and means extending through said discharge opening for receiving and maintaining separated the objects as they are poured from the different pockets of the buckets in passing around the head loop of their path.

14. In an elevator of the type described, the improvement which comprises a casing having a lower portion to receive the objects to be elevated, an endless series of articulated buckets adapted to travel a closed path in said casing with the path looping in said receiving portion, said buckets opening inwardly of their path and being partitioned to provide a plurality of separated object receiving pockets, and a multiple lane feeding spout extending into the receiving portion of the casing and terminating within the said loop of the bucket path, each lane of the spout having a separate discharge opening which is arranged to pour the objects passing therethrough into a particular pocket of each bucket as the bucket passes beneath the spout.

15. In an elevator of the type described, the improvement which comprises a casing having a lower portion to receive the objects to be elevated, an endless series of articulated buckets adapted to travel a closed path in said casing with the path looping in said receiving portion, said buckets opening inwardly of their path and being partitioned to provide a plurality of separated object receiving pockets, a multiple lane feeding spout extending into the receiving portion of the casing and terminating within the said loop of the bucket path, each lane of the spout having a separate discharge opening which is arranged to pour the objects passing therethrough into a particular pocket of each bucket as the bucket passes beneath the spout, and a series of parallel plates arranged within the said loop of the bucket path and cooperating with the separate discharge openings of the spout lanes and the parallel walls and partitions of the buckets which form their pockets for assuring proper delivery of the objects.

16. In an elevator of the type described, the improvement which comprises a casing having a lower portion to receive the objects to be elevated, an endless series of articulated buckets adapted to travel a closed path in said casing with the path looping in said receiving portion, said buckets opening inwardly of their path, and a multiple lane feeding spout extending into the receiving portion of the casing and terminating within the said loop of the bucket path, each lane of the spout having a separate discharge opening which is arranged to pour the objects passing through the opening into a different portion of each bucket as the bucket passes beneath the spout.

17. In an elevator of the type described, the improvement which comprises a casing having a feed opening formed in the lower portion thereof, an endless series of articulated buckets adapted to travel a closed path in said casing with the path looping below the feed opening, said buckets opening inwardly of their path, a multiple lane feeding spout extending into the casing through its feed opening and terminating within the said loop of the bucket path, each lane of the spout having a separate discharge opening which is arranged to pour the objects passing through the opening into a different portion of each bucket as the bucket passes beneath the spout, and a series of parallel plates arranged within the said loop of the bucket path and cooperating with the separate discharge openings of the spout lanes for directing the objects into the different portions of each bucket.

18. In an elevator of the type described, the improvement which comprises a casing having a discharge opening formed in the upper portion thereof, an endless series of articulated buckets adapted to travel a closed path in said casing with the path looping above the discharge opening, said buckets opening inwardly of their path and being partitioned to provide a plurality of separated object receiving pockets, and a discharge spout closed on all four sides and extending at an inclined angle through the discharge opening of the casing and then vertically to terminate within the said loop of the bucket path, said spout having partitions extending longitudinally thereof and registering at their upper ends with the partitions of the buckets as the latter pass around said loop of their path to maintain the objects poured from the different bucket pockets separated while passing through the discharge spout.

19. In an elevator of the type described, the improvement which comprises a casing having a discharge opening formed in the upper portion thereof, a head shaft passing through the casing above the discharge opening and having a pair of spaced driving wheels mounted thereon, a pair of endless chains trained over said driving wheels and adapted to travel a closed path in said casing with the said chain paths looping above the discharge opening of the casing, an endless series of buckets positioned between and attached to the two endless chains, means for guiding the chains and their buckets through a looped path in the lower portion of the casing, take-up mechanism for adjusting the head shaft vertically to vary the tension applied to the chains, said buckets opening inwardly of their path, and a discharge spout extending at an inclined angle through the discharge opening of the casing and then vertically to terminate within the said upper loop of the bucket path, said discharge spout being divided into two sections with a telescopic, slidable joint formed between the adjacent ends of said sections, means for supporting the inner section on the head shaft so that it will partake of adjusting movements of said shaft, and means for attaching the lower section of the spout to the walls of the casing.

20. In an elevator of the type described, the improvements which comprise a casing having a feed opening formed in its lower portion and a discharge opening formed in its upper portion, an endless series of articulated buckets adapted to travel a closed path in said casing with the path looping below the feed opening and above the discharge opening, said buckets opening inwardly of their path and being partitioned to provide a plurality of separated object receiving pockets, a multiple lane feeding spout extending into the casing through the feed opening and terminating within the adjacent loop of the bucket path, each lane of the spout having a separate discharge opening which is arranged to pour the objects passing through the opening into a particular pocket of each bucket as the bucket passes beneath the spout, a series of parallel plates arranged within the said loop of the bucket path and cooperating with the separate discharge openings of the spout lanes and the parallel walls and partitions of the buckets which form their pockets for assuring proper delivery of the objects to the buckets, and a discharge spout closed on all four sides and extending at an inclined angle through the discharge opening of the casing and then vertically to terminate within the adjacent loop of the bucket path, said spout having partitions extending longitudinally thereof and registering with the partitions of the buckets as the latter pass around the upper loop of their path to maintain the objects poured from the different bucket pockets separated while passing through the discharge spout.

21. In an elevator of the type described, a head shaft having a pair of spaced driving wheels, endless chains trained over said wheels to form a head loop, means to loop the chains at the foot of the elevator, take-up mechanism to adjust the position of the head shaft for maintaining the chains properly tensioned, a series of inwardly opening buckets arranged between and attached to said chains, means for delivering the objects to be transported into the buckets as they pass around the foot loop of the elevator path, discharge means extending up into the head loop for receiving the objects as they are poured from the buckets in passing around the head drive wheels, and means for effecting adjustment of the discharge means in accordance with take-up adjustments of the head shaft.

22. In an elevator of the type described, a head shaft having a pair of spaced driving wheels, endless chains trained over said wheels to form a head loop, means to loop the chains at the foot of the elevator, take-up mechanism to adjust the position of the head shaft for maintaining the chains properly tensioned, a series of inwardly opening buckets arranged between and attached to said chains, means for delivering the objects to be transported into the buckets as they pass around the foot loop of the elevator, discharge means extending up into the head loop for receiving the objects as they are poured from the buckets in passing around the head drive wheels, and means for adjusting the discharge means to take care of take-up adjustments of the head shaft.

23. In an elevator of the type described, a head shaft having a pair of spaced driving wheels, endless chains trained over said wheels to form a head loop, means to loop the chains at the foot of the elevator, take-up mechanism to adjust the position of the head shaft for maintaining the chains properly tensioned, a series of inwardly opening buckets arranged between and attached to said chains, means for delivering the objects to be transported into the buckets as they pass around the foot loop of the elevator, discharge means extending up into the head loop for receiving the objects as they are poured from the buckets in passing around the head drive wheels, and means for supporting the discharge means and effecting its adjustment in accordance with take-up adjustments of the head shaft.

24. In an elevator of the type described, an endless series of inwardly opening articulated buckets, means for supporting said series of buckets to cause the same to travel a closed path with the path forming a foot loop and a head loop, take-up mechanism operatively associated with one of the loop portions of the bucket path for maintaining the series of buckets properly tensioned by adjusting the location of the said loop portion, feed and discharge spout means terminating within the foot loop and the head loop portions, respectively, of the bucket path, and means for effecting adjustment of the spout means associated with the take-up mechanism adjusted loop portion of the bucket path in accordance with take-up adjustments of said loop portion.

HERBERT E. SCHRADER.